(12) United States Patent
Polasa et al.

(10) Patent No.: US 11,936,231 B2
(45) Date of Patent: Mar. 19, 2024

(54) SYSTEM AND METHOD FOR DETECTING ELECTRICAL CONNECTION AND DISCONNECTION ON USB TYPE-A CHARGING PORT

(71) Applicant: SILICONCH SYSTEMS PVT LTD, Karnataka (IN)

(72) Inventors: Rakesh Kumar Polasa, Karnataka (IN); Satish Anand Verkila, Karnataka (IN); Burle Naga Satyanarayana, Andhra Pradesh (IN)

(73) Assignee: SILICONCH SYSTEMS PVT LTD, Karnataka (IN)

( * ) Notice: Subject to any disclaimer, the term of this patent is extended or adjusted under 35 U.S.C. 154(b) by 0 days.

(21) Appl. No.: 18/079,158

(22) Filed: Dec. 12, 2022

(65) Prior Publication Data

US 2023/0106813 A1 Apr. 6, 2023

Related U.S. Application Data

(62) Division of application No. 16/898,113, filed on Jun. 10, 2020, now Pat. No. 11,689,041.

(30) Foreign Application Priority Data

Apr. 14, 2020 (IN) .............................. 202041016124

(51) Int. Cl.
*H02J 7/00* (2006.01)
*H02M 3/07* (2006.01)
*H02M 3/156* (2006.01)

(52) U.S. Cl.
CPC ........ *H02J 7/00714* (2020.01); *H02J 7/0047* (2013.01); *H02M 3/07* (2013.01); *H02M 3/1563* (2013.01); *H02J 2207/30* (2020.01)

(58) Field of Classification Search
CPC .. H02J 7/00714; H02J 7/0047; H02J 2207/30; H02M 3/07; H02M 3/1563; G06F 1/266; G06F 1/263
See application file for complete search history.

(56) References Cited

U.S. PATENT DOCUMENTS

| 7,268,561 | B2 * | 9/2007 | Zhu | ..................... G06F 13/4081 710/15 |
| 2011/0260742 | A1 * | 10/2011 | Sims | ....................... G01L 1/205 363/13 |

(Continued)

FOREIGN PATENT DOCUMENTS

| AU | 2015202651 A1 * | 12/2015 | ................ B25F 5/00 |
| AU | 2015202651 A1 | 12/2015 | |

(Continued)

OTHER PUBLICATIONS

Universal Serial Bus Type-C Cable and Connector Specification Release 2.0, USB 3.0 Promoter Group, Aug. 2019 (373 pages).

(Continued)

*Primary Examiner* — S M Sohel Imtiaz
(74) *Attorney, Agent, or Firm* — Procopio, Cory, Hargreaves & Savitch LLP

(57) ABSTRACT

Systems and methods for detecting electrical connection and disconnection on an USB Type-A charging port like power adapters, power banks and car chargers having one or more USB Type-A charging port of an USB device. The system includes: a voltage source; a MOSFET SWITCH gate driver, in USB type-A connected state, that operatively couples MOSFET SWITCH with voltage source and VBUS supply of USB type-A port; charge pump; a current sense differential amplifier; and a control unit configured to: monitor VBUS current, and detect potential disconnected state of connected USB type-A port; and monitor VBUS voltage and compare VBUS voltage with predetermined voltage to sense (Continued)

external condition such that VBUS voltage drops because of load capacitance and load current. The control unit is further configured to, when the duty cycle has reached a minimum VBUS current, detect the USB type-A disconnection with a charge pump state.

8 Claims, 5 Drawing Sheets

(56) References Cited

U.S. PATENT DOCUMENTS

| | | | | |
|---|---|---|---|---|
| 2013/0049680 | A1* | 2/2013 | Katsumata | H01M 10/48 320/107 |
| 2018/0356873 | A1* | 12/2018 | Regupathy | G06F 1/3253 |
| 2020/0078078 | A1* | 3/2020 | Henderson | H04L 49/25 |
| 2020/0314569 | A1* | 10/2020 | Morgan | A61B 18/1206 |

FOREIGN PATENT DOCUMENTS

| | | |
|---|---|---|
| CN | 108628789 A | 10/2018 |
| CN | 109494820 A | 3/2019 |

OTHER PUBLICATIONS

Universal Serial Bus Power Delivery Specification, Revision 3.0, Version 2.0, Aug. 29, 2019 (657 pages).

\* cited by examiner

SYSTEM AND METHOD FOR DETECTING ELECTRICAL CONNECTION AND DISCONNECTION ON USB TYPE-A CHARGING PORT

CROSS REFERENCE TO RELATED APPLICATIONS

This application is a divisional of U.S. application Ser. No. 16/898,113, filed on Jun. 10, 2020, which claims benefit under 35 U.S.C. § 119 and claims priority to Indian Patent Application No. IN 202041016124, filed on Apr. 14, 2020, titled "SYSTEM AND METHOD FOR DETECTING ELECTRICAL CONNECTION AND DISCONNECTION ON USB TYPE-A CHARGING PORT", the content of which is incorporated herein in its entirety by reference for all purposes.

BACKGROUND

Technical Field

The present disclosure relates to systems and methods for detecting electrical connection and dis-connection of devices. More particularly, the present disclosure relates to a system and method for detecting electrical connection and/or dis-connection on universal serial bus (USB) type-A charging ports.

Background

Background description includes information that can be useful in understanding the present invention. It is not an admission that any of the information provided herein is prior art or relevant to the presently claimed invention, or that any publication specifically or implicitly referenced is prior art.

Universal Serial Bus (USB) is an industry protocol designed to standardize interfaces between computing devices for communication and for supplying electrical power. The USB protocols have enjoyed widespread adoption in nearly every computing device and have received tremendous support in terms of technology development with well-established and standardized software infrastructure. USB is one of most common interfaces for connecting a variety of peripherals to computers and providing relatively local and small levels of data transfer. USB interfaces can be found on everything from personal computers and laptops, to peripheral devices, mobile phones, cameras, flash memory sticks, back up hard-drives and many other devices. USB has been implemented in several versions to meet data transfer and power requirements. The versions can be USB 1, USB 1.1, USB 2, USB 3.2 and USB 4.

USB is a host-centric plug-and-play bus. A logical USB bus connects USB devices with a USB host, using a physical tiered star topology. A system has one host with a hub at the centre of each star. Hubs convert a single attachment point (port) into multiple attachment points. The upstream port of a hub connects the hub towards the host. Each of the downstream ports of a hub allows connection to another hub or a function. Each wire segment is a point-to-point connection between the host and a hub or function, or a hub connected to another hub or function. A function of a USB device to transmit or receive data or control information over the bus and as such provide capabilities to the system. Examples of functions include locator devices such as a mouse, tablet, or light pen, input devices such as a keyboard or a scanner, output devices such as a printer or digital speakers, and a telephony adapter. Each function contains configuration information that describes its capabilities and resource requirements. Before a function can be used, the host must configure it. This configuration includes allocating USB bandwidth and selecting function-specific configuration options.

USB ports are implemented extensively to connect peripheral devices to computing devices such as a computer, laptop, personal digital assistant (PDA), and so on. USB ports can be implemented for providing charging of various electronic devices and computing devices. There are general peripheral connections that can be connected through USB which can include printers, scanners, zip drives, digital cameras, mice, joysticks, modems, speakers, telephones, video phones and any other network connections. A USB cable, according to the USB standard, has a power supply line of +5V (Volt), a ground line, and two D+ and D− signal lines. The USB cable, according to the USB standard, can supply a predefined or predetermined current in miliamperes (mA) at +5V while transmitting signals. A type of performing charging using this power supply is called USB charging. USB connectors are provided at either end of USB cable to facilitate connections between one or more computing devices, electronic devices, power adapter, and so on, through USB ports. USB connectors can be of multiple types such as USB type-A connector, USB type-B connector, USB type-C connector, Mini-USB (of both type-A and type-B), Micro-USB (of both type-A and type-B) etc. There can also be corresponding USB ports or sockets (such as type-A, type-B, type-C, Mini-USB, Micro-USB etc.). Based on in-built protocols implemented in the type-C USB port, it can be known as to whether type-C port is connected or dis-connected. For USB type-A ports, which are used only for providing power to charge devices such as power adapters, power banks, car-chargers, and so on, voltage should always be there from the start. Most of the existing USB type-A charging ports may not be able to distinguish or detect whether any device is connected or dis-connected as they may not have reliable and accurate detection mechanism.

Typically, the indication of a connection to the USB Type-A charging port occurs through voltage driven signal on D+/D− lines by the portable sink devices. However, not all portable sink devices send out a signal on the D+/D− line to indicate connections, and thus, D+/D− monitoring on the USB Type-A charging port is limited to portable sink devices that allow for connection indication through D+/D− line.

Efforts have been made in the related or existing art to detect connection and/or dis-connection of external or peripheral devices on USB ports of either power adapter or of computing devices.

In the related art, there is a method and a device of detecting connection of USB (Universal Serial Bus) equipment and a host and the USB equipment, which are applicable to the technical field of mobile terminals. The method of detecting connection of the USB equipment and the host is applied to the USB equipment, and includes detecting a pin level of a power supply positive-pole lead in USB connection lines; and determining, according to the pin level, whether the USB equipment is connected with the host. According to the method, an effect that whether the USB equipment is connected with the host is detected at a USB equipment side can be realized. However, this related art implementation may not implement any detection mechanism for USB type-A ports especially as the detection mentioned in this application may not give accurate detection and may consume more power.

In another related art implementation, there is a modified Series A universal serial bus (USB) receptacle connector is equipped with the functionality to allow the electronic system in which it resides to be configured either as a host device or a peripheral device. The modified USB Series A receptacle connector, according to related art implementation, may include a mechanism such as an additional pin or a mechanical switch to detect the presence of a standard USB Series A plug being inserted into it. Upon detection of a plug, an algorithm may allow the system to determine whether it is to act as a host device or a peripheral device and to determine which device supplies power. However, the application does not provide a solution for automatically detecting an electrical connection or disconnection of USB type-A charging port. Further, the solution provided by the cited patent document cannot be applied to legacy USB Type-A connectors without an additional requirement of special connectors.

SUMMARY

There is a need to provide a reliable and efficient system and method for detecting electrical connection and disconnection on USB type-A port of charger devices configured with one or more ports (i.e. to enable either single or multi-port applications). Further, there is a need to provide the system and method to enable detection of connection and disconnection which facilitates low power of the device when no port(s) are connected and share the power effectively across different ports in a multiport devices when ports are connected.

It is an object of the embodiments of the present disclosure to provide a system and method for detecting electrical connection and dis-connection on USB type-A port of charging devices.

It is another object of the embodiments of the present disclosure to provide a simple and cost-effective system and method for detecting electrical connection and dis-connection on USB type-A port of charging devices.

It is another object of the embodiments of the present disclosure to provide a reliable and efficient system and method for detecting electrical connection and dis-connection on USB type-A port of charging devices.

It is another object of the embodiments of the present disclosure to provide a robust system and method for detecting electrical connection and dis-connection on USB type-A port of charging devices.

The present disclosure relates to systems and methods for detecting electrical connection and dis-connection of devices. More particularly, the present disclosure relates to a system and method for detecting electrical connection and/or dis-connection on universal serial bus (USB) type-A charging ports.

The present disclosure relates to all USB Devices which can be single or multi-port with at least one USB Type-A Charging port present in the Power Adapter, Power bank or car charger or any USB device capable of providing power through USB Type-A charging port This summary is provided to introduce simplified concepts of a system for time bound availability check of an entity, which are further described below in the detailed description. This summary is not intended to identify key or essential features of the claimed subject matter, nor is it intended for use in determining/limiting the scope of the claimed subject matter.

An aspect of the present disclosure pertains to a system for detecting electrical connection and disconnection on an USB type-A charging port of an USB device having one or more USB ports (i.e. either single port or multi-port device). The system can include a power source (or a power supply unit); a MOSFET (metal oxide semiconductor field effect transistor) switch gate driver that can be configured to, in an USB type-A connected state, operatively couple a MOSFET switch (field effect transistor) with the power source and VBUS supply of the USB type-A port of the USB device; a current sense differential amplifier that can be operatively coupled to the USB device; a charge pump that can be operatively coupled to the USB device and can be configured to, upon activation, maintain the VBUS voltage at around 5V and a current within a first range of values; a voltage sense operatively coupled with the USB device and configured to sense VBUS voltage; and a control unit. The control unit can include one or more processors and a memory coupled with the one or more processors, the memory storing computer implemented instructions which when executed by the one or more processors to: monitor, using the current sense differential amplifier, VBUS current flowing on VBUS pin of the USB device, in an USB type-A connected state, through an external sense resistor, and amplify the monitored VBUS current, wherein when the monitored VBUS current is less than a predetermined current, for a pre-configured time window, the control unit can be configured to detect a potential disconnected state of the connected USB type-A port; and monitor, using a voltage sense, the VBUS voltage such that the control unit can be configured to compare the monitored VBUS voltage with a predetermined voltage to sense an external condition such that VBUS voltage can drop because of a load capacitance and a load current, and wherein when the VBUS voltage drops below the predetermined voltage, the control unit can be configured to detect the USB type-A connected state.

In an embodiment, the first range of values for the current can be from about 10 µA to several mA.

In another embodiment, the control unit can be configured to monitor a set of data lines (D+ and D−) of the USB type-A port to enable entry to the USB type-A disconnection with the charge pump state such that the MOSFET switch can be disabled in the USB type-A disconnection with charge pump state and the charge pump can be activated.

In an embodiment, in the USB type-A potential disconnected (or duty cycle) state, the control unit can be configured to enable and disable the MOSFET switch in cycles such that when the MOSFET switch is enabled, an output VBUS capacitor can be charged to 5V and when the MOSFET SWITCH is disabled, the output VBUS capacitor can provide power to a load through a connected USB type-A port.

In another embodiment, in the USB type-A potential disconnected state, the control unit can be configured to operate the MOSFET switch with a constant ON time and a variable OFF time, and wherein variable OFF time increases over time by measuring voltage and current over said time.

In another embodiment, in the USB type-A potential disconnect state, the control unit can be configured to sense an external load current of a first range of values for the current, based on monitoring of the VBUS voltage and comparison of the VBUS voltage with the predetermined voltage.

In another embodiment, the control unit can be configured to transition to a connected state when the VBUS voltage decreases less than the predetermined voltage for a first predetermined set of cycles, and the control unit can be configured to decrease the duty cycle when the VBUS voltage is not less than the predetermined voltage for the first predetermined set of cycles with the constant ON time and the variable OFF time.

In another embodiment, when the duty cycle has reached the V_VBUS_THR2, which corresponds to a minimum VBUS current is reached, the control unit can be configured to detect the USB type-A disconnection with a charge pump state.

In another embodiment, when the USB type-A connection is detected, then the control unit can be configured to control A-GATE-ENABLE of the MOSFET switch and 5V-ENABLE of power supply unit or voltage source.

Another aspect of the present disclosure pertains to a method for detecting electrical connection and dis-connection on an USB type-A charging port of an USB device having one or more USB ports (i.e. either single port or multi-port device). The method can include steps of: maintaining, by a charge pump operatively coupled to the USB device, upon activation, VBUS voltage at around 5V and a current within a first range of values; monitoring, using a current sense differential amplifier operatively coupled to a control unit, VBUS current flowing on VBUS pin of the USB device, in an USB type-A connected state, through an external sense resistor, and amplifying the monitored VBUS current, wherein when the monitored VBUS current is less than a predetermined current, for a pre-configured time window, the control unit is configured to detect a potential disconnected state of the connected USB type-A port; and monitoring, using a voltage detection comparator, the VBUS voltage such that the control unit is configured to compare the monitored VBUS voltage with a predetermined voltage to sense an external condition such that VBUS voltage drops because of a load capacitance and a load current, and wherein when the VBUS voltage drops below the predetermined voltage, the control unit can be configured to detect the USB type-A connected state.

In an embodiment, at the steps of monitoring current and voltage, in the USB type-A potential disconnected (or duty cycle) state, the control unit can be configured to enable and disable the MOSFET switch in cycles such that when the MOSFET switch is enabled, an output VBUS capacitor can be charged to 5V and when the MOSFET switch is disabled, the output VBUS capacitor can provide power to a load through a connected USB type-A port.

In another embodiment, in the USB type-A potential disconnected state, the control unit can be configured to operate the MOSFET switch with a constant ON time and a variable OFF time, and wherein variable OFF time increases over time by measuring voltage and current over said time.

In another embodiment, in the USB type-A potential disconnect state, the control unit can be configured to sense an external load current of a first range of values for the current, based on monitoring of the VBUS voltage and comparison of the VBUS voltage with the predetermined voltage.

In another embodiment, the control unit can be configured to transition to a connected state when the VBUS voltage decreases less than the predetermined voltage for a first predetermined set of cycles, and the control unit can be configured to decrease the duty cycle when the VBUS voltage is not less than the predetermined voltage for the first predetermined set of cycles with the constant ON time and the variable OFF time.

Various objects, features, aspects and advantages of the inventive subject matter will become more apparent from the following detailed description of preferred embodiments, along with the accompanying drawing figures in which like numerals represent like components

BRIEF DESCRIPTION OF THE DRAWINGS

The diagrams are for illustration only, which thus is not a limitation of the present disclosure, and wherein.

DETAILED DESCRIPTION

Figure 1:
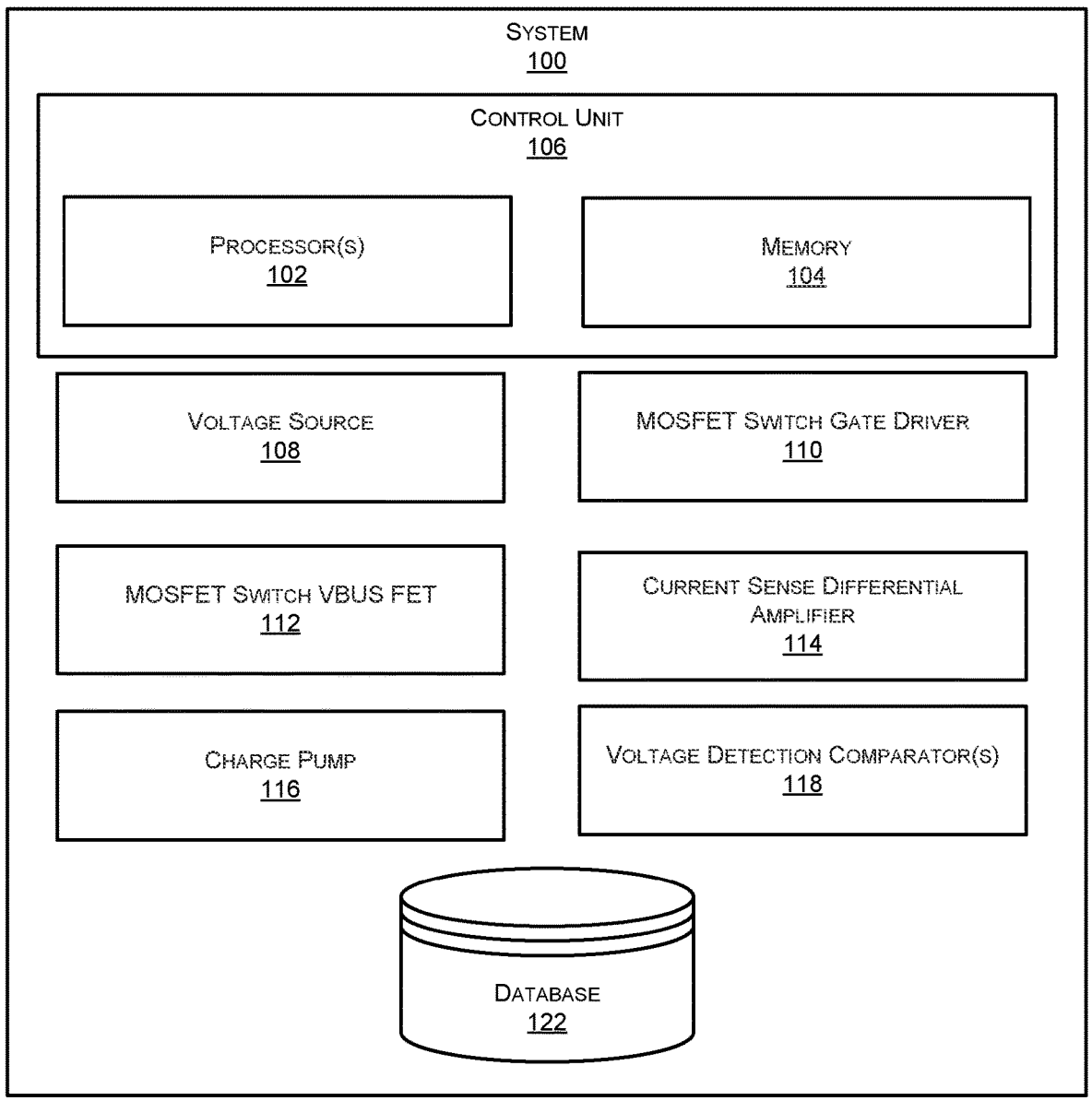
FIG. 1 illustrates an exemplary module diagram representation of a system for detecting electrical connection and dis-connection on an USB type-A port of an USB device having one or more USB ports, in accordance with an embodiment of the present disclosure.

In some embodiments, the numbers expressing quantities or dimensions of items, and so forth, used to describe and claim certain embodiments of the invention are to be understood as being modified in some instances by the term "about." Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Further, embodiments described herein may be implemented singly, or in combination with other embodiments to facilitate the desired implementation.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the present disclosure as defined by the appended claims.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein. Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named element.

Embodiments of the present invention may be provided as a computer program product, which may include a machine-readable storage medium tangibly embodying thereon instructions, which may be used to program a computer (or other electronic devices) to perform a process. The term "machine-readable storage medium" or "computer-readable storage medium" includes, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware). A machine-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

All methods described herein may be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition persons in the pertinent art have given that term as reflected in printed publications and issued patents at the time of filing.

The present disclosure relates to systems and methods for detecting electrical connection and dis-connection of devices. More particularly, the present disclosure relates to a system and method for detecting electrical connection and/or dis-connection on universal serial bus (USB) ports.

The present disclosure relates to all USB Devices which can be single or multi-port with at least one USB Type-A Charging port present in the Power Adapter, Power bank or car charger or any USB device capable of providing power through USB Type-A charging port An aspect of the present disclosure pertains to a system for detecting electrical connection and disconnection on an USB type-A charging port of an USB device having one or more USB ports (i.e. either single port or multi-port device). The system can include a power source (or a power supply unit); a MOSFET (metal oxide semiconductor field effect transistor) switch gate driver that can be configured to, in an USB type-A connected state, operatively couple a MOSFET switch (field effect transistor) with the power source and VBUS supply of the USB type-A port of the USB device; a current sense differential amplifier that can be operatively coupled to the USB device; a charge pump that can be operatively coupled to the USB device and can be configured to, upon activation, maintain the VBUS voltage at around 5V and a current within a first range of values; a voltage sense operatively coupled with the USB device and configured to sense VBUS voltage; and a control unit. The control unit can include one or more processors and a memory coupled with the one or more processors, the memory storing computer implemented instructions which when executed by the one or more processors to: monitor, using the current sense differential amplifier, VBUS current flowing on VBUS pin of the USB device, in an USB type-A connected state, through an external sense resistor, and amplify the monitored VBUS current, wherein when the monitored VBUS current is less than a predetermined current, for a pre-configured time window, the control unit can be configured to detect a potential disconnected state of the connected USB type-A port; and monitor, using a voltage sense, the VBUS voltage such that the control unit can be configured to compare the monitored VBUS voltage with a predetermined voltage to sense an external condition such that VBUS voltage can drop because of a load capacitance and a load current, and wherein when the VBUS voltage drops below the predetermined voltage, the control unit can be configured to detect the USB type-A connected state.

In an embodiment, the first range of values for the current can be from about 10 $\mu$A to several mA.

In another embodiment, the control unit can be configured to monitor a set of data lines (D+ and D−) of the USB type-A port to enable entry to the USB type-A disconnection with the charge pump state such that the MOSFET switch can be disabled in the USB type-A disconnection with charge pump state and the charge pump can be activated.

In an embodiment, in the USB type-A potential disconnected (or duty cycle) state, the control unit can be configured to enable and disable the MOSFET switch in cycles such that when the MOSFET switch is enabled, an output VBUS capacitor can be charged to 5V and when the MOSFET SWITCH is disabled, the output VBUS capacitor can provide power to a load through a connected USB type-A port.

In another embodiment, in the USB type-A potential disconnected state, the control unit can be configured to operate the MOSFET switch with a constant ON time and a variable OFF time, and wherein variable OFF time increases over time by measuring voltage and current over said time.

In another embodiment, in the USB type-A potential disconnect state, the control unit can be configured to sense an external load current of a first range of values for the current, based on monitoring of the VBUS voltage and comparison of the VBUS voltage with the predetermined voltage.

In another embodiment, the control unit can be configured to transition to a connected state when the VBUS voltage decreases less than the predetermined voltage for a first predetermined set of cycles, and the control unit can be configured to decrease the duty cycle when the VBUS voltage is not less than the predetermined voltage for the first predetermined set of cycles with the constant ON time and the variable OFF time.

In another embodiment, when the duty cycle has reached the V_VBUS_THR2, which corresponds to a minimum VBUS current is reached, the control unit can be configured to detect the USB type-A disconnection with a charge pump state.

In another embodiment, when the USB type-A connection is detected, then the control unit can be configured to control A-GATE-ENABLE of the MOSFET switch and 5V-ENABLE of power supply unit or voltage source.

Another aspect of the present disclosure pertains to a method for detecting electrical connection and dis-connection on an USB type-A charging port of an USB device having one or more USB ports (i.e. either single port or multi-port device). The method can include steps of: maintaining, by a charge pump operatively coupled to the USB device, upon activation, VBUS voltage at around 5V and a current within a first range of values; monitoring, using a current sense differential amplifier operatively coupled to a control unit, VBUS current flowing on VBUS pin of the USB device, in an USB type-A connected state, through an external sense resistor, and amplifying the monitored VBUS current, wherein when the monitored VBUS current is less than a predetermined current, for a pre-configured time window, the control unit is configured to detect a potential disconnected state of the connected USB type-A port; and monitoring, using a voltage detection comparator, the VBUS voltage such that the control unit is configured to compare the monitored VBUS voltage with a predetermined voltage to sense an external condition such that VBUS voltage drops because of a load capacitance and a load current, and wherein when the VBUS voltage drops below the predetermined voltage, the control unit can be configured to detect the USB type-A connected state.

In an embodiment, at the steps of monitoring current and voltage, in the USB type-A potential disconnected (or duty cycle) state, the control unit can be configured to enable and disable the MOSFET switch in cycles such that when the MOSFET switch is enabled, an output VBUS capacitor can be charged to 5V and when the MOSFET switch is disabled, the output VBUS capacitor can provide power to a load through a connected USB type-A port.

In another embodiment, in the USB type-A potential disconnected state, the control unit can be configured to operate the MOSFET switch with a constant ON time and a variable OFF time, and wherein variable OFF time increases over time by measuring voltage and current over said time.

In another embodiment, in the USB type-A potential disconnect state, the control unit can be configured to sense an external load current of a first range of values for the current, based on monitoring of the VBUS voltage and comparison of the VBUS voltage with the predetermined voltage.

In another embodiment, the control unit can be configured to transition to a connected state when the VBUS voltage decreases less than the predetermined voltage for a first predetermined set of cycles, and the control unit can be configured to decrease the duty cycle when the VBUS voltage is not less than the predetermined voltage for the first predetermined set of cycles with the constant ON time and the variable OFF time.

In an embodiment, the proposed method can be implemented for shared multi-port charger devices containing multiple USB type-A or a combination of type-A and type-C or a combination of other ports along with the USB type-A. the method detects the USB type-A connection or disconnection and shares the power across the ports, which reduces the bill of material (BOM) cost and area.

In another embodiment, by keeping VBUS alive using a weak power supply (such as auxiliary power supply) instead of a main power supply, the proposed method also reduces the power consumption.

FIG. 1 illustrates an exemplary module diagram representation of a system for detecting electrical connection and dis-connection on an USB type-A port of an USB device having one or more USB ports, in accordance with an embodiment of the present disclosure.

According to an embodiment, the system 100 can include one or more processor(s) 102. The one or more processor(s) 102 can be implemented as one or more microprocessors, microcomputers, microcontrollers, digital signal processors, central processing units, logic circuitries, and/or any devices that manipulate data based on operational instructions, and can involve pure hardware processor(s) or a combination of hardware and software processor(s) to facilitate the desired implementation. Among other capabilities, the one or more processor(s) 102 are configured to fetch and execute computer-readable instructions stored in a memory 104 of the system 100. The memory 104 can store one or more computer-readable instructions or routines, which can be fetched and executed to create or share the data units over a network service. The memory 104 can include any non-transitory storage device including, for example, volatile memory such as RAM, or non-volatile memory such as EPROM, flash memory, and the like.

Various components/units of the proposed system 100 can be implemented as a combination of hardware and programming (for example, programmable instructions) to implement their one or more functionalities as elaborated further themselves or using processors 102. In examples described herein, such combinations of hardware and programming can be implemented in several different ways. For example, the programming for the units can be processor executable instructions stored on a non-transitory machine-readable storage medium and the hardware for units can include a processing resource (for example, one or more processors), to execute such instructions. In the present examples, the machine-readable storage medium can store instructions that, when executed by the processing resource, implements the various units. In such examples, the system 100 can include the machine-readable storage medium storing the instructions and the processing resource to execute the instructions, or the machine-readable storage medium can be separate but accessible to the system 100 and the processing resource. In other examples, the units can be implemented by electronic circuitry. A database 122 can include data that is either stored or generated as a result of functionalities implemented by any of the other components/units of the proposed system 100.

In an embodiment, the system 100 for detecting electrical connection and disconnection on an USB type-A port using current sense differential amplifier 114 having one or more USB ports is disclosed.

In an embodiment, the system 100 can include: a voltage source or a power supply unit 108; MOSFET switch gate driver 110; that can be configured to, in an USB type-A connected state, be operatively coupled to a MOSFET SWITCH VBUS field effect transistor (FET) 112 with the voltage source 108 and VBUS supply of the USB type-A port of the current sense differential amplifier 114; a charge pump 116 that can be operatively coupled to the current sense differential amplifier 114; and a voltage detection comparator(s) 118 that can be operatively coupled to the current sense differential amplifier 114 and can be configured to, upon activation, maintain the VBUS voltage at around 5V with a current in a first range of values.

In an embodiment, the system 100 can include a control unit 106 that can include one or more processors 102 and memory 104 coupled with the one or more processors 102. The memory 104 can store instructions executable by the one or more processors 102 to: monitor, using the current sense differential amplifier 114, VBUS current flowing on a VBUS pin of the current sense differential amplifier 114, in an USB type-A connected state, through an external sense resistor, and amplify the monitored VBUS current, wherein when the monitored VBUS current is less than a predetermined current, for a pre-configured time window, the control unit 106 can be configured to detect a potential disconnected state of the connected USB type-A port; and monitor, using a voltage detection comparator 118, the VBUS voltage such that the control unit 106 can be configured to compare the monitored VBUS voltage with a predetermined voltage to sense an external condition such that VBUS voltage drops because of a load capacitance and a load current, and wherein when the VBUS voltage drops below the predetermined voltage, the control unit 106 can be configured to detect the USB type-A connected state.

In an embodiment, in the USB type-A potential disconnected or duty cycle state, the control unit 106 can be configured to enable and disable the MOSFET switch 112 in cycles such that when the MOSFET switch is enabled, an output VBUS capacitor can be charged to 5V and when the MOSFET switch 112 is disabled, the output VBUS capacitor can be discharged through the USB type-A port.

In an embodiment, in the USB type-A potential disconnected state, the control unit 106 can be configured to operate the MOSFET switch 112 to enable charging of the output VBUS capacitor.

In an embodiment, in the USB type-A potential disconnect state, the control unit 106 can be configured to sense an external load current of a first range of values for the current, based on monitoring of the VBUS voltage and comparison of the VBUS voltage with the predetermined voltage.

In an embodiment, the control unit 106 can be configured to increase a duty cycle when the VBUS voltage decreases less than the predetermined voltage for a first predetermined set of cycles, and wherein the control unit 106 can be configured to decrease the duty cycle when the VBUS voltage is not less than the predetermined voltage for the first predetermined set of cycles.

In an embodiment, when the duty cycle corresponding to a maximum VBUS current is reached for a second predetermined set of cycles, the control unit 106 can be configured to detect the USB type-A connected state, and wherein when the duty cycle corresponding to a minimum VBUS current is reached for a third predetermined set of cycles, the control unit 106 can be configured to detect the USB type-A disconnection with a charge pump state.

In an exemplary embodiment, when (V_VBUS<V_BUS_ THR1) for T_DEBOUNCE2 time, the control unit 106 can be configured to detect a USB Type-A connected state, and when ((I_VBUS<I_VBUS_THR2) AND/OR (V-VBUS>V_VBUS_THR2)) for T_DEBOUNCE 3, which corresponds to the minimum VBUS current, the control unit 106 can be configured to detect USB Type-A disconnection with the charge pump state.

In an embodiment, the control unit 106 can be configured to monitor a set of data lines (D+ and D−) of the USB type-A port to enable entry to the USB type-A disconnection with the charge pump state such that the MOSFET switch 112 can be disabled in the USB type-A disconnection with charge pump state and the charge pump 116 can be activated.

In an embodiment, when the USB type-A connection is detected, the control unit 106 can be configured to control A-GATE-ENABLE of the MOSFET switch 112 and 5V-EN-ABLE of power supply unit 108.

In an exemplary embodiment, the predetermined current and predetermined voltage values can be stored in the database 122 that can be operatively coupled to the control unit 106.

It would be appreciated that although the proposed system 100 has been elaborated as above to include all the main units, it is conceivable that actual implementations are well within the scope of the present disclosure, which can include without any limitation, only a part of the proposed units or a combination of those or a division of those into sub-units in various combinations across multiple devices that can be operatively coupled with each other, including in the cloud. Further, the units can be configured in any sequence to achieve objectives elaborated. Also, it can be appreciated that proposed system 100 can be configured in a computing device or across a plurality of computing devices operatively connected with each other, wherein the computing devices can be any of a computer, a laptop, a smart phone, an Internet enabled mobile device and the like. Therefore, all possible modifications, implementations and embodiments of where and how the proposed system 100 is configured are well within the scope of the present invention.

Figure 2:
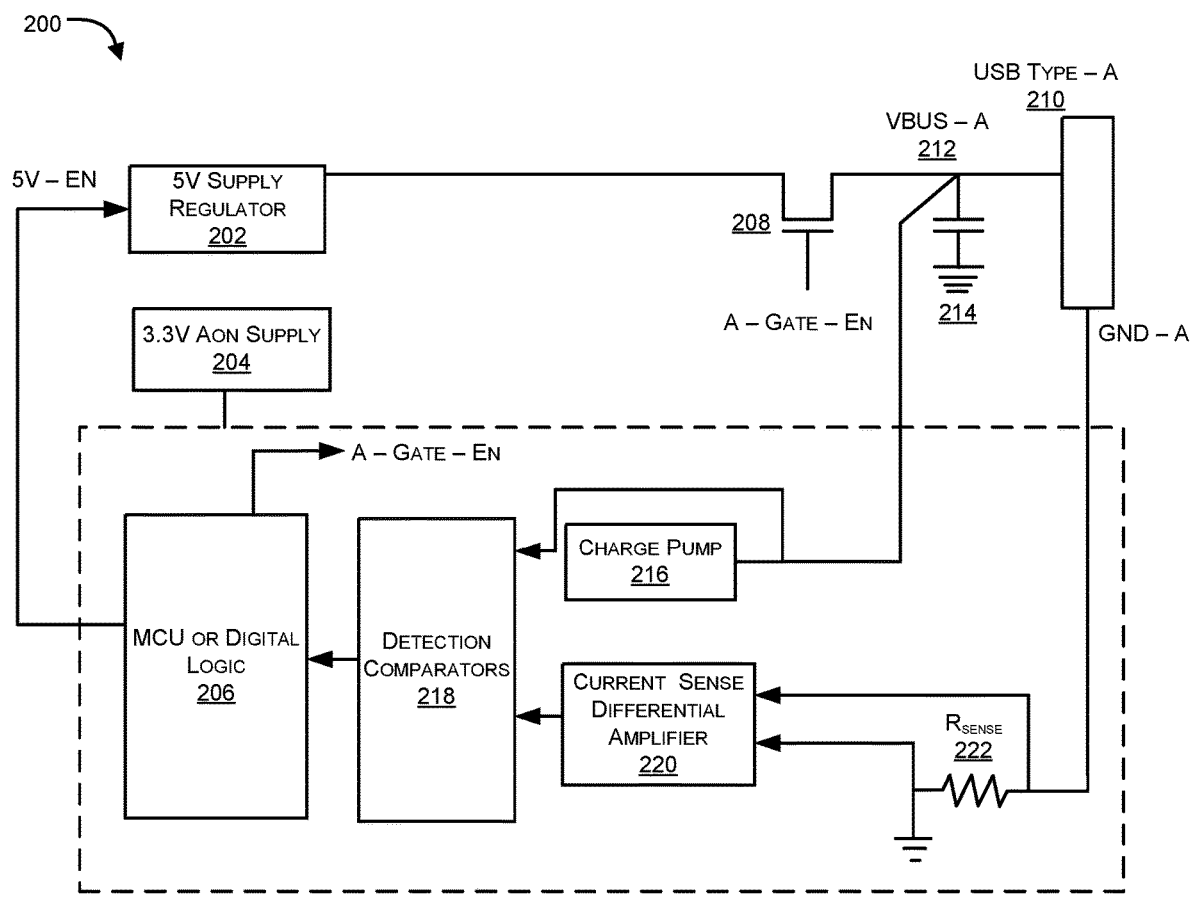
FIG. 2 illustrates an exemplary architecture representation of the system of FIG. 1 for detecting connection/disconnection on single USB type-A port device, in accordance with an embodiment of the present disclosure.

FIG. 2 illustrates an exemplary architecture representation of the system of FIG. 1 for detecting connection/disconnection on single USB type-A port device, in accordance with an embodiment of the present disclosure.

In an embodiment, the system 200 of FIG. 2 can include a 5V supply regulator 202 with 5V-EN pin, 3.3V AON supply 204, microcontroller unit (MCU) or digital logic 206 with A-GATE-EN pin connected to MOSFET switch 208. The MOSFET switch 208 can be connected to USB type-A port 210 via VBUS-A 212. A capacitor (VBUS Cap) 214 can be connected to VBUS pin of type-A port 210. A charge pump 216 can be provided to the VBUS-A pin 212 of USB type-A port 210. The charge pump 216 can be provided to a detection comparator 218. The system 200 can include a current sense differential amplifier 220, and a current sense resistor 222 that can be provided as an input to the detection comparator 218. The detection comparator can be fed to the MCU or digital logic 206.

In an exemplary embodiment, for single port application, the system of FIG. 2 can be configured to facilitate low power at system level such that a high power 5V supply rail can be switched off and the USB type-A connection/disconnection detection can be adapted to work on an "always on" low power rail that is less than 5V (e.g., generally 3.3V).

In an exemplary embodiment, in the case of a single port connection, the corresponding USB type-A port can support standard or proprietary charging protocols with VBUS varying from 3.6V to 20V.

Referring to FIG. 1, the USB type-A detection system 100 can be implemented using digital logic or computer code running on a microcontroller unit (MCU) for detecting connection/disconnection. The system 100 can include an USB type-A detection interface, which can interact with other sub-blocks through a bus interface when implemented through MCU or through custom interface when implemented using logic.

In an exemplary embodiment, V-SRC is an output of power converter that can vary from 3.6V to 20V with default power-on of 5V.

Figure 3:
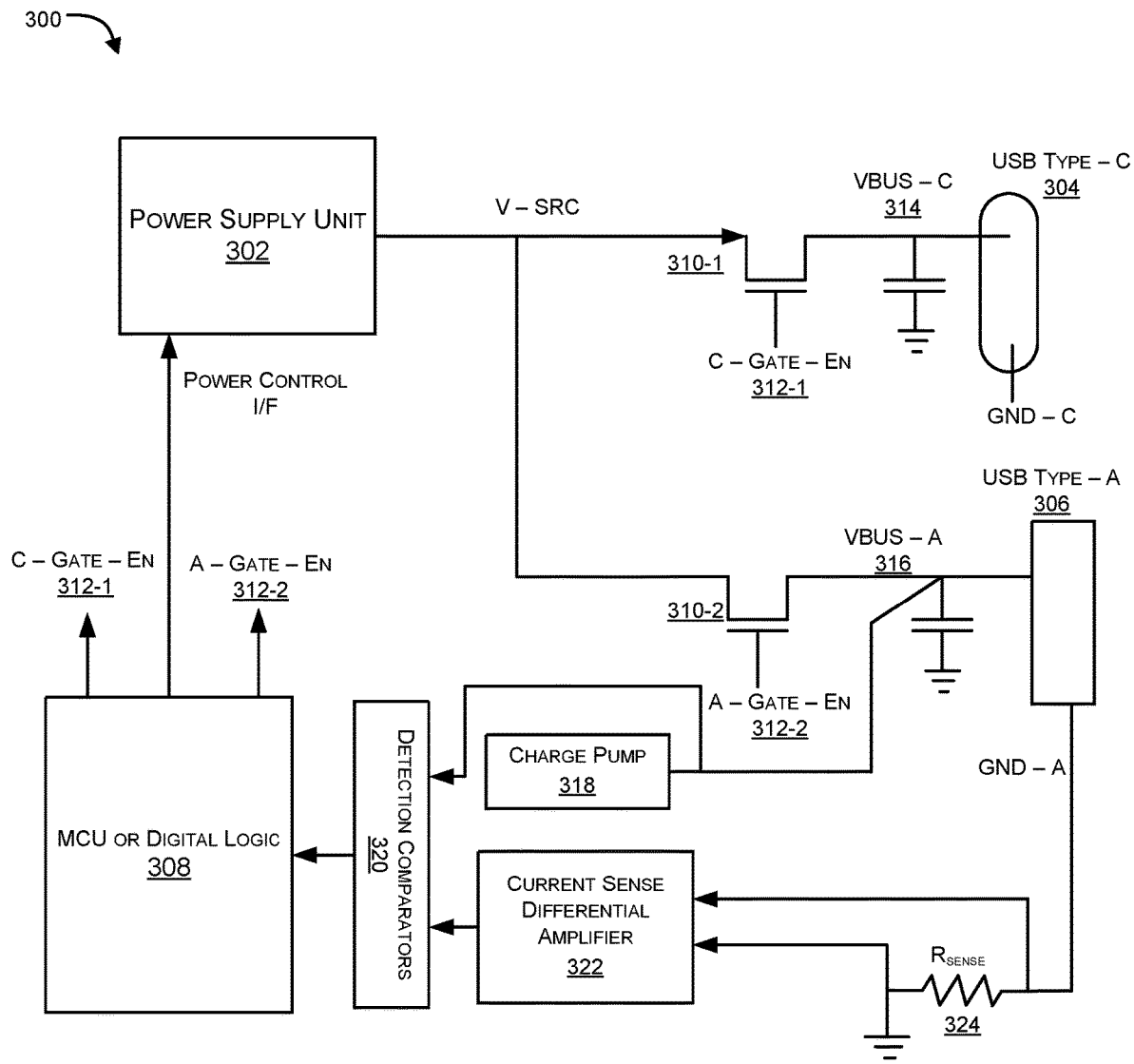
FIG. 3 illustrates an exemplary architecture representation of the system of FIG. 1 for detecting connection/disconnection on USB type-A port in multi-port power adapter, in accordance with an embodiment of the present disclosure.

FIG. 3 illustrates an exemplary architecture representation of the system of FIG. 1 for detecting connection/disconnection on USB type-A port in multi-port power adapter, in accordance with an embodiment of the present disclosure.

In an embodiment, multi-port system 300 of FIG. 3 can include power supply unit 302 that can be configured to provide power in form of voltage (V-SRC) to USB type-C port 304 and to USB type-A port 306 respectively. The power supply unit 302 can be triggered with power control information from MCU or digital logic 308. Two FETs (310-1 & 310-2) are provided such that one FET 310-1 can be connected in between power supply unit 302 and VBUS-C pin 314 of USB type-C port and another FET 310-2 can be connected in between power supply unit 302 and VBUS-A pin 316 of USB type-A port of multi-port power adapter respectively. Both the FETs (310-1 & 310-2) can be provided with respective enable pins C-GATE-EN 312-1 & A-GATE-EN 312-2 that can be driven by the MCU 308. The system 300 can include a charge pump 318 that can be provided to VBUS-A pin 316 and to a detection comparator 320 respectively. The detection comparator 320 can be provided with input from current sense differential amplifier 322.

In another embodiment, a capacitor can be connected to a VBUS pin of type-C port 314, and a capacitor can be connected to VBUS pin of type-A port 316.

In an embodiment, USB type-C port 304 can be connected to ground (GND-C) and USB type-A port can be connected to ground (GND-A) respectively.

In another embodiment, both grounds GND-C and GND-A, after the sense resistor, can be shorted.

In an exemplary embodiment, one or more ports (304 & 306) can support standard or proprietary charging schemes such that each can have at least one single USB type-A port with single power converter.

In an exemplary embodiment, if more than one port is connected in multi-port system 300, then all the ports can be restricted to 5V. When one port is connected and working with a proprietary charging scheme, then a second port is connected. The type-C port gets a hard reset, and output from type-A is restarted to 5V.

Referring to FIGS. 2 & 3, the MCU (206 or 308) can be configured to detect input VBUS voltage and VBUS current. Based on instructions from USB type-A detection and/or comparator unit (218 or 318), MOSFET SWITCH gate driver can enable the MOSFET switch connected to V-SRC such that MOSFET switch can connect V-SRC to VBUS supply of the USB type-A connector.

Referring to FIG. 2 and FIG. 3, in an exemplary embodiment, once a power-on is received, USB type-A port can be in a USB type-A connected state, wherein the USB type-A connected state can indicate USB type-A connection. In the USB type-A connected state, VBUS current can be monitored continuously. If the sensed VBUS current is less than the LSB (I_VBUS_THR1) of a measurement block for a configurable time window (T_DEBOUNCE1), then the USB type-A connection can move to a USB type-A potential disconnect (duty cycle) state. The USB type-A potential disconnect (duty cycle) state can indicate a potential USB type-A disconnection. In an exemplary embodiment, the duty cycle, and/or the frequency can be adjusted from a maximum to a minimum. For a present duty cycle step, if VBUS voltage decreases less than a threshold or predetermined voltage for a few cycles, then the duty cycle can be increased. Similarly, if VBUS voltage is not below the threshold for few cycles, then the duty cycle can be decreased.

In an exemplary embodiment, USB type-A disconnection (charge pump) state can indicate a USB type-A disconnection. The entry to the USB type-A disconnection (charge pump) state can happen through independent monitoring of D+/D− lines of USB type-A connector for ports supporting proprietary charging schemes. In the USB type-A disconnection (charge pump) state, the MOSFET switch can be disabled. In the USB type-A disconnection (charge pump) state, the internal charge pump can be enabled, which maintains the VBUS voltage ~5V with a current in a first range of values. In the USB type-A disconnection (charge pump) state, VBUS voltage can be continuously monitored and compared with the configurable threshold, which indirectly senses external connection.

Figure 4:
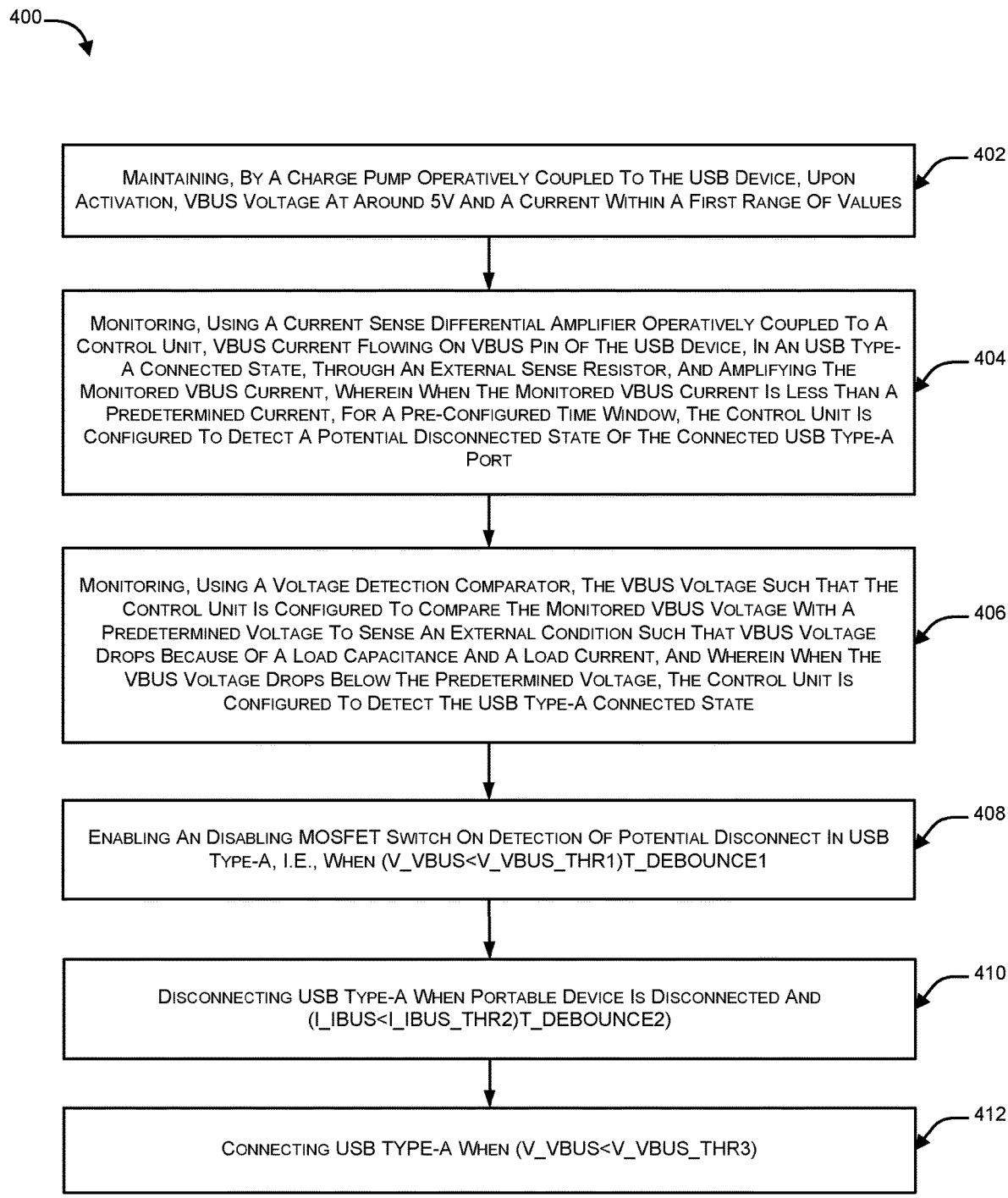
FIG. 4 illustrates an exemplary flow diagram representation of a method for detecting electrical connection and dis-connection on an USB type-A port of an USB device having one or more USB ports, in accordance with an embodiment of the present disclosure.

FIG. 4 illustrates an exemplary flow diagram representation of a method for detecting electrical connection and dis-connection on an USB type-A port of an USB device having one or more USB ports, in accordance with an embodiment of the present disclosure According to an embodiment, the method 400 can include at a step 402, maintaining, by a charge pump operatively coupled to the USB device, upon activation, VBUS voltage at around 5V with a current in a first range of values.

In an embodiment, the method 400 can include at a step 404, periodically polling, using a current sense differential amplifier operatively coupled to a control unit, VBUS current flowing on the VBUS pin of the USB device, in an USB type-A connected state, through an external sense resistor, and amplifying the monitored VBUS current, wherein when the monitored VBUS current is less than a predetermined current (i.e., I_VBUS<I_VBUS_THR2), for a pre-configured time window, the control unit is configured to detect a potential disconnected state of the connected USB type-A port. The polling can occur in the loop, where the duty cycle can be decreased by maintaining ON time and increasing OFF time (T_DEBOUNCE2).

In an embodiment, the method 400 can include at a step 406, periodically polling, using a voltage detection comparator, the VBUS voltage such that the control unit is configured to compare the monitored VBUS voltage with a predetermined voltage to sense an external condition such that VBUS voltage drops because of a load capacitance and a load current, and wherein when the VBUS voltage drops below the predetermined voltage (i.e., V_VBUS<V_VBUS_THR2), the control unit is configured to detect the USB type-A connected state. The polling can occur in loop, where the duty cycle can be decreased by maintaining ON time and increasing OFF time (T_DEBOUNCE2).

In another embodiment, the method 400, at step 408 can include detecting potential disconnected state when (I_VBUS<I_VBUS_THR1)T_DEBOUNCE1 and enabling and disabling MOSFET switch on detection thereof, wherein when (V_VBUS<V_VBUS_THR1)T_DEBOUNCE2, a connected state for USB type-A is entered into.

In another embodiment, the method 400, at step 410 can include disconnecting USB type-A when ((I_VBUS<I_VBUS_THR2) and/or (V_VBUS>V_VBUS_THR2)) T_DEBOUNCE3.

In another embodiment, the method 400, at step 412 can include connecting the USB Type-A when (V_VBUS<V_VBUS_THR3).

Figure 5:
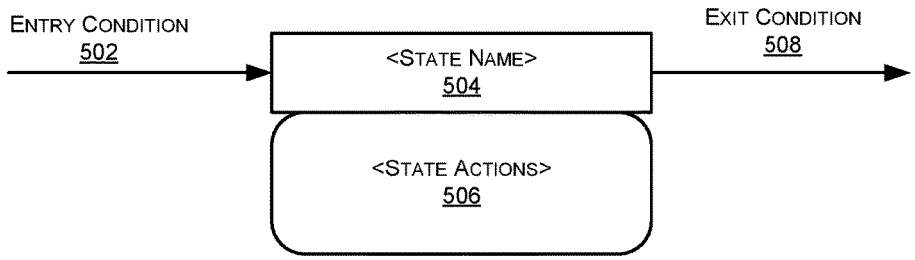
FIG. 5 illustrates legends for state depiction, in accordance with an embodiment of the present disclosure.

FIG. 5 illustrates legends for state depiction, in accordance with an embodiment of the present disclosure.

In another embodiment, once getting power-on (502), USB type-A port can be in USB type-A connected state (504), wherein the USB type-A connected state can indicate USB type-A connection. In the USB type-A connected state, VBUS current can be monitored continuously (506). If the sensed VBUS current is less than a predetermined threshold (I_VBUS_THR1) of measurement block for a configurable time window (T_DEBOUNCE1), then USB type-A connection can move to USB type-A potential disconnect (duty cycle) state (508). The USB type-A potential disconnect (duty cycle) state can indicate potential USB type-A disconnection.

In another embodiment, USB type-A disconnection (charge pump) state (502) can indicate USB type-A disconnection (504). Entry to USB type-A disconnection (charge pump) state can happen through independent monitoring of D+/D− lines of USB type-A connector for ports supporting proprietary charging schemes (506). In the USB type-A disconnection (charge pump) state, MOSFET switch can be disabled. In the USB type-A disconnection (charge pump) state (508), the internal charge pump can be enabled, which maintains the VBUS voltage ~5V with a current in a first range of values. In the USB type-A disconnection (charge pump) state, VBUS voltage can be continuously monitored and compared with the configurable threshold, which indirectly senses external connection.

Figure 6:
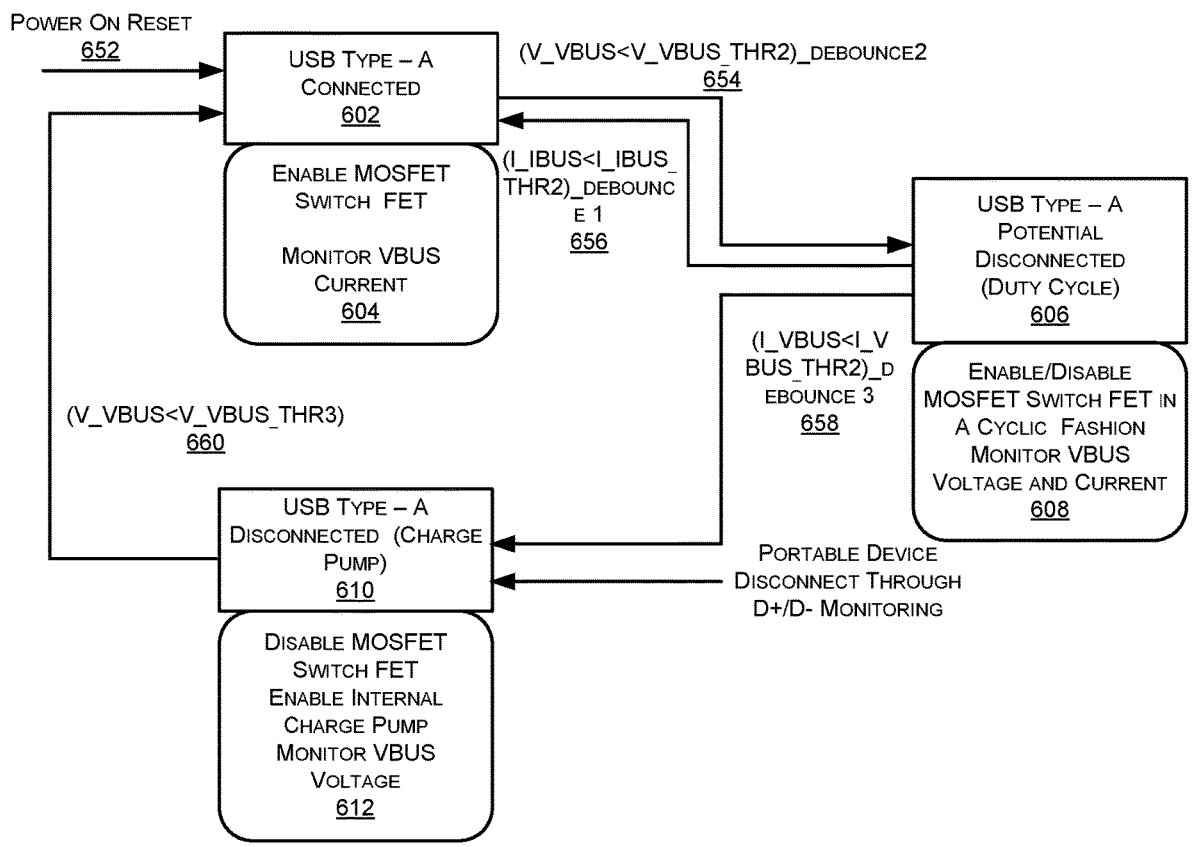
FIG. 6 illustrates an exemplary architecture representation of the system for detecting connection/disconnection on USB type-A port in Multi-port power adapter, in accordance with an embodiment of the present disclosure.

FIG. 6 illustrates an exemplary architecture representation 600 of the system for detecting connection/disconnection on USB type-A port in a Multi-port power adapter, in accordance with an embodiment of the present disclosure.

As shown in FIG. 6, due to power on reset (652), USB type-A goes to connected state (602), and in this state, MOSFET switch FET can be enabled and VBUS current can be monitored (604). Entry to USB type-A state can happen through independent monitoring of D+/D− lines of USB type-A connector for ports supporting proprietary charging schemes (650). When (V_VBUS<V_VBUS_THR1)T_DEBOUNCE2 (654), then a USB type-A potential disconnection (duty cycle) will occur (606). In this state, MOSFET switch can be enabled and disabled in a cyclic fashion and VBUS voltage and current can be monitored (608). When (I_VBUS<I_VBUS_THR2) and/or (V_VBUS>V_VBUS_THR2)T_DEBOUNCE3 (658) and when portable device disconnect through D+/D− monitoring is provided, then the USB type-A will be disconnected (charge pump) (610). In this state, MOSFET switch can be disabled, internal charge pump can be enabled and VBUS voltage can be monitored (612). When (V_BUS<V_VBUS_THR3) (660), then USB type-A can be connected.

In another embodiment, entry to USB type-A disconnection (charge pump) state can happen through independent monitoring of D+/D− lines of USB type-A connector for ports supporting proprietary charging schemes.

The current and voltage values are periodically polled and monitored (608) for the conditions as mentioned above. The polling can occur in loop (606), where the duty cycle can be decreased by maintaining ON time and increasing OFF time (T_DEBOUNCE).

In an embodiment, when (I_VBUS<I_VBUS_THR1)_DEBOUNCE1 (656), then USB type-A can be connected.

Thus, it will be appreciated by those of ordinary skill in the art that the diagrams, schematics, illustrations, and the like represent conceptual views or processes illustrating systems and methods embodying this invention. The functions of the various elements shown in the figures can be provided through the use of dedicated hardware as well as hardware capable of executing associated software. Similarly, any switches shown in the figures are conceptual only. Their function can be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

In the foregoing description, numerous details are set forth. It will be apparent, however, to one of ordinary skill in the art having the benefit of this disclosure, that the present invention can be practiced without these specific details. In some instances, well-known structures and devices are shown in block diagram form, rather than in detail, to avoid obscuring the present invention.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps can be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention can be devised without departing from the basic scope thereof. The scope of the invention is determined by the claims that follow. The invention is not limited to the described embodiments, versions or examples, which are included to enable a person having ordinary skill in the art to make and use the invention when combined with information and knowledge available to the person having ordinary skill in the art.

Embodiments of the present disclosure provide a system and method for detecting electrical connection and dis-connection on USB type-A port charging devices.

Embodiments of the present disclosure provide a simple and cost-effective system and method for detecting electrical connection and dis-connection on USB type-A port charging devices.

Embodiments of the present disclosure provide a reliable and efficient system and method for detecting electrical connection and dis-connection on USB type-A port of charging devices.

Embodiments of the present disclosure provide a robust system and method for detecting electrical connection and dis-connection on USB type-A port of charging devices.

Embodiments of the present disclosure provide a method for implementing shared multi-port charger devices containing one or more USB Type-A ports with or without a combination of other ports by detecting USB type-A port connections and disconnections and sharing power across the ports, which reduces bill of material (BOM) cost and area.

Embodiments of the present disclosure provide a method for detecting electrical connection and dis-connection on USB type-A, which is independent of data lines (D+ and D−) dependency.

Embodiments of the present disclosure provide a method to enable low power of the device when no ports are connected.

Embodiments of the present disclosure provide a method to enable low power of the device by effectively sharing power between connected ports.

Embodiments of the present disclosure provide a system that does not require special connectors such as Type-A port with detection pin.

We claim:

1. A method for detecting electrical connection and disconnecting on an USB type-A charging port of an USB device comprising one or more USB ports, the method comprising:

maintaining, by a charge pump operatively coupled to a source side of the USB device, upon activation, VBUS voltage at around 5V and a current within a first range of values;

monitoring, using a current sense differential amplifier operatively coupled to a control unit, VBUS current flowing on VBUS pin of the USB device, in an USB type-A connected state, through an external sense resistor, and amplifying the monitored VBUS current, wherein, when the monitored VBUS current is less than a predetermined current, for a pre-configured time window, detecting a potential disconnected state of the connected USB type-A port; and monitoring, using a voltage detection comparator, the VBUS voltage to compare the monitored VBUS voltage with a predetermined voltage to sense an external condition such that VBUS voltage drops from a load capacitance and a load current, and wherein when the VBUS voltage drops below the predetermined voltage, detecting the USB type-A connected state.

2. The method as claimed in claim 1, wherein in the USB type-A potential disconnected state, enabling and disabling a MOSFET switch in cycles such that when the MOSFET switch is enabled, an output VBUS capacitor is charged to 5V and when the MOSFET switch is disabled, the output VBUS capacitor is configured to provide power to a load through a connected USB type-A port.

3. The method as claimed in claim 2, wherein in the USB type-A potential disconnected state, the MOSFET switch operates with a constant ON time and a variable OFF time, and wherein variable OFF time increases over time by measuring voltage and current over said time.

4. The method as claimed in claim 2, wherein in the USB type-A potential disconnect state, an external load current senses with a current in the first range of values, based on monitoring of the VBUS voltage and comparison of the VBUS voltage with the predetermined voltage.

5. The method as claimed in claim 2, further comprising transitioning to a connected state when the VBUS voltage decreases less than the predetermined voltage for a first predetermined set of cycles, wherein decreasing a duty cycle when the VBUS voltage is not less than the predetermined voltage for the first predetermined set of cycles with a constant ON time and a variable OFF time.

6. The method as claimed in claim 5, wherein, when the duty cycle has reached a minimum VBUS current, the USB type-A disconnection is detected with a charge pump state.

7. A method for detecting electrical connection and disconnection on an USB type-A charging port of an USB device comprising one or more USB ports, the method comprising:

maintaining, by a charge pump operatively coupled to the USB device, upon activation, VBUS voltage at around a predetermined voltage and a current within a first range of values;

monitoring, using a current sense differential amplifier operatively coupled to a control unit, VBUS current flowing on VBUS pin of the USB device, in an USB type-A connected state, through an external sense resistor, and amplifying the monitored VBUS current, wherein, when the monitored VBUS current is less than a predetermined current, for a pre-configured time window, detecting a potential disconnected state of the connected USB type-A port; and monitoring, using a voltage detection comparator, the VBUS voltage to compare the monitored VBUS voltage with a predetermined voltage to sense an external condition such that VBUS voltage drops from a load capacitance and a load current, and wherein when the VBUS voltage drops below the predetermined voltage, detecting the USB type-A connected state, wherein in the USB type-A potential disconnected state, enabling and disabling a MOSFET switch in cycles such that when the MOSFET switch is enabled, an output VBUS capacitor is charged to the predetermined voltage and when the MOSFET switch is disabled, the output VBUS capacitor is configured to provide power to a load through a connected USB type-A port.

8. The method as claimed in claim 7, wherein the predetermined voltage is 5V.

* * * * *